US 8,122,440 B1

(12) United States Patent
Lentini et al.

(10) Patent No.: US 8,122,440 B1
(45) Date of Patent: Feb. 21, 2012

(54) METHOD AND APPARATUS FOR ENUMERATING EXTERNAL PROGRAM CODE DEPENDENCIES

(75) Inventors: James Lentini, Woburn, MA (US); Thomas Talpey, Stow, MA (US)

(73) Assignee: NetApp, Inc., Sunnyvale, CA (US)

( * ) Notice: Subject to any disclaimer, the term of this patent is extended or adjusted under 35 U.S.C. 154(b) by 1143 days.

(21) Appl. No.: 11/862,009

(22) Filed: Sep. 26, 2007

(51) Int. Cl.
*G06F 9/45* (2006.01)
*G06F 9/445* (2006.01)

(52) U.S. Cl. .................. 717/141; 717/140; 717/148

(58) Field of Classification Search .......... 717/139–145, 717/148–151
See application file for complete search history.

(56) References Cited

U.S. PATENT DOCUMENTS

| | | | |
|---|---|---|---|
| 4,667,290 A * | 5/1987 | Goss et al. ............... | 717/147 |
| 5,325,533 A * | 6/1994 | McInerney et al. ........... | 717/107 |
| 5,613,117 A * | 3/1997 | Davidson et al. ............. | 717/144 |
| 5,758,160 A * | 5/1998 | McInerney et al. ........... | 717/104 |
| 6,067,641 A * | 5/2000 | McInerney et al. ........ | 714/38.13 |
| 6,237,136 B1 * | 5/2001 | Sadahiro ........................ | 717/110 |
| 6,243,863 B1 * | 6/2001 | Kothari et al. ................ | 717/149 |
| 6,526,569 B1 * | 2/2003 | Obin et al. ..................... | 717/140 |
| 7,152,229 B2 * | 12/2006 | Chong et al. .................. | 717/146 |
| 7,178,137 B1 * | 2/2007 | Peak et al. ..................... | 717/131 |
| 7,194,735 B2 * | 3/2007 | Barclay .......................... | 717/148 |
| 7,237,234 B2 * | 6/2007 | Granston et al. ............... | 717/151 |
| 7,316,010 B1 * | 1/2008 | Daynes et al. ................. | 717/140 |
| 7,526,760 B1 * | 4/2009 | Daynes et al. ................. | 717/153 |
| 7,596,778 B2 * | 9/2009 | Kolawa et al. ................ | 717/126 |
| 7,665,075 B1 * | 2/2010 | Daynes et al. ................. | 717/148 |
| 7,810,082 B2 * | 10/2010 | Levenshteyn ................. | 717/141 |
| 7,861,236 B2 * | 12/2010 | Grebenev ....................... | 717/142 |
| 7,895,585 B2 * | 2/2011 | Prakash et al. ................ | 717/151 |

OTHER PUBLICATIONS

Yu et al, "Removing false code dependencies to sppedup software build process", ACM CASCON, pp. 1-10, 2003.*
Huck et al, "Capturing performance knowledge for automated analysis", IEEE, pp. 1-10, 2008.*
Hoste et al, "Automated Just in time compiler tuning", ACM CGO, pp. 62-72, 2010.*
Touati et al, "On the decidability of phase ordering problem in optimizing compillation", ACM CF, pp. 147-156, 2006.*

* cited by examiner

*Primary Examiner* — Anil Khatri
(74) *Attorney, Agent, or Firm* — Cooper Legal Group, LLC

(57) ABSTRACT

A computer-implemented method and apparatus for enumerating program code dependencies is provided. According to an embodiment of the invention, a user selects or otherwise indicates a code base to be processed and analyzed for the purpose of enumerating those program code modules required by the code base in order to properly compile and execute the code base. Next, the code base is processed in accordance with instructions designed to mirror those of a compiler for compiling the code base. Accordingly, external program code dependencies are identified using compile time compilation parameters, as well as extensive programming language analysis.

20 Claims, 4 Drawing Sheets

EXAMPLE 1

```
#define DEFINE_STRUCTURE(x) struct bar x      /* line 1 */
DEFINE_STRUCTURE(my_bar);                     /* line 2 */
```

EXAMPLE 2

```
extern int foo;
static void bar(void)
{
        foo++  /* reference to external foo variable */
        {
                int foo;
                foo++; /* reference to local foo variable */
        }
}
```

EXAMPLE 3

```
static void bar(void)
{
        int foo = 1;     /* definition of variable foo */
foo:
        if(!foo){
                foo--;
                goto foo;
        }
}
```

EXAMPLE 4

```
#if MY_VARIABLE
struct foo {
#else
union foo {
#endif
        int x;
}
```

FIG. 2

METHOD AND APPARATUS FOR ENUMERATING EXTERNAL PROGRAM CODE DEPENDENCIES

FIELD OF THE INVENTION

The invention generally relates to the field of software development. More specifically, the invention relates to a method and apparatus for identifying and enumerating external program code dependencies.

BACKGROUND

In the field of software development, program code is often developed in separate modules. The separate program code modules are then combined, or linked, during a compilation process that generates an executable application. For example, as shown in FIG. 1, several independent source code files (e.g., files 10, 12, 14 and 16), each including one or more independent program code modules, are converted to object files (e.g, 18, 20, 22 and 24) before a linker 26 links the object files to generate an executable file 28. If necessary, the linker 26 may also link one or more code modules from a runtime library 30. There are a variety of often-cited advantages to developing code in this modular approach. One such advantage is reusability. For instance, a particular source code module that is associated with a particular aspect or feature set of a hardware device may be used in generation after generation of that hardware device with few, if any, changes.

Despite the many well-known advantages to the modular approach to developing program code, one of the difficulties with the modular approach is identifying and managing the various external program code dependencies associated with a particular code base. Given a particular program code module, an external program code dependency exists where, in order to compile, execute and/or function properly, that particular program code module is dependent upon an external program code module. In the case of the popular C programming language, external program code dependencies arise in one of two situations. In the C programming language, program code dependencies arise when program code is included by using the "#include" pre-processor directive, and when "identifiers" (e.g., macros, variables, functions, types, and labels) are referenced, but not defined, in the code base.

Being able to quickly and accurately identify all external program code dependencies is important, particularly when trying to port complex software from one operating system to another. When porting software from one operating system to another, identifying external program code dependencies early in the development process allows the software developer to re-implement the features or behaviors required for a particular program code module to work with the target system, or to re-work the base software code so as not to require the particular features or behaviors provided by the external code.

A variety of techniques and tools exist (with varying levels of efficiency and effectiveness) for identifying external program code dependencies. Many existing techniques and tools fail to identify all types of external program code dependencies. Furthermore, existing tools and techniques often fail to accurately identify the particular file containing the program code on which the code base depends. For example, one way to identify external program code dependencies, such as those associated with "#include" pre-processor directives, is to simply search through the code base for the "#include" statements, and then cross reference the files indicated in the code base with a known list of files. Generally, this method is effective in identifying the existence of external program code dependencies; however, this method is subject to error in determining the proper file on which the code base depends. This is in part due to the specific compilation parameters used by compilers, and the possibility of complicated include paths that are setup by makefiles used in compiling the code base. Accordingly, knowledge of the software's compilation parameters is necessary to produce an accurate list of files containing program code on which the code base depends.

Likewise, determining an identifier's correct definition is often problematic. In the C programming language, a set of reserved words, operators, and separators are defined. All other text strings within the base code are either integer constants or identifiers, and differentiating between the two is as simple as determining whether the text string begins with a numeric character. By definition, C identifiers cannot begin with a numeric character. However, as illustrated in the code examples in FIG. 2, identifying the existence of an external program code dependency, and identifying the program code module on which the code base depends, is often a difficult task.

Example 1 in FIG. 2 illustrates the difficulty in determining the proper definition for a C identifier. In the code of Example 1 (FIG. 2), a structure of type bar is defined. However, the definition for the particular structure is generated using a macro. Consequently, given only line 2 of the code, it is not possible to recognize that the structure "my_bar" is being defined. Accordingly, searching for and finding the proper definition is not as simple as it might seem.

As illustrated in the code of Examples 2 and 3 in FIG. 2, the definition of a reference may vary depending on the scope and namespace, respectively. For example, as illustrated in Example 2, the identifier 'foo' is incremented in two different locations. One of the "foo" variables is locally defined, while the other is not. Accordingly, the definition of the variable is dependent upon the scope. Similarly, in example 3, the variable "foo" is referenced in two different namespaces. These examples illustrate why, in many cases, manually determining the definition of a reference is difficult without careful examination of the code, because often the definition referenced by an identifier varies depending on the scope and namespace respectively.

As illustrated in Example 4 of FIG. 2, a compile time parameter determines which definition is ultimately used for the identifier "foo". Accordingly, the type and/or definition used for a particular identifier can change depending on one or more compile time parameters. This illustrates that compilation parameters can affect the definition of an identifier in complex ways. Therefore, producing a correct list of external program code dependencies is not a simple task and generally requires an understanding of programming language and compilation process and parameters.

SUMMARY

A computer-implemented method for enumerating external program code dependencies is disclosed. According to an embodiment of the invention, a code base is identified by a user for input to a code analyzing tool. The code base is analyzed by the tool, by processing the code base in accordance with a set of compilation instructions associated with the code base. During the processing of the code base, the program code modules that are not defined within the code base, but are necessary for generating an executable output file in accordance with the compilation instructions, are identified. Upon completion of the processing of the code base, the dependent entities within the code base are listed along with a filename and file path to a file with the program code module defining the dependent entity.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 2 includes a listing of code examples illustrating the difficulty in identifying external program code dependencies.

DESCRIPTION

Figure 1:
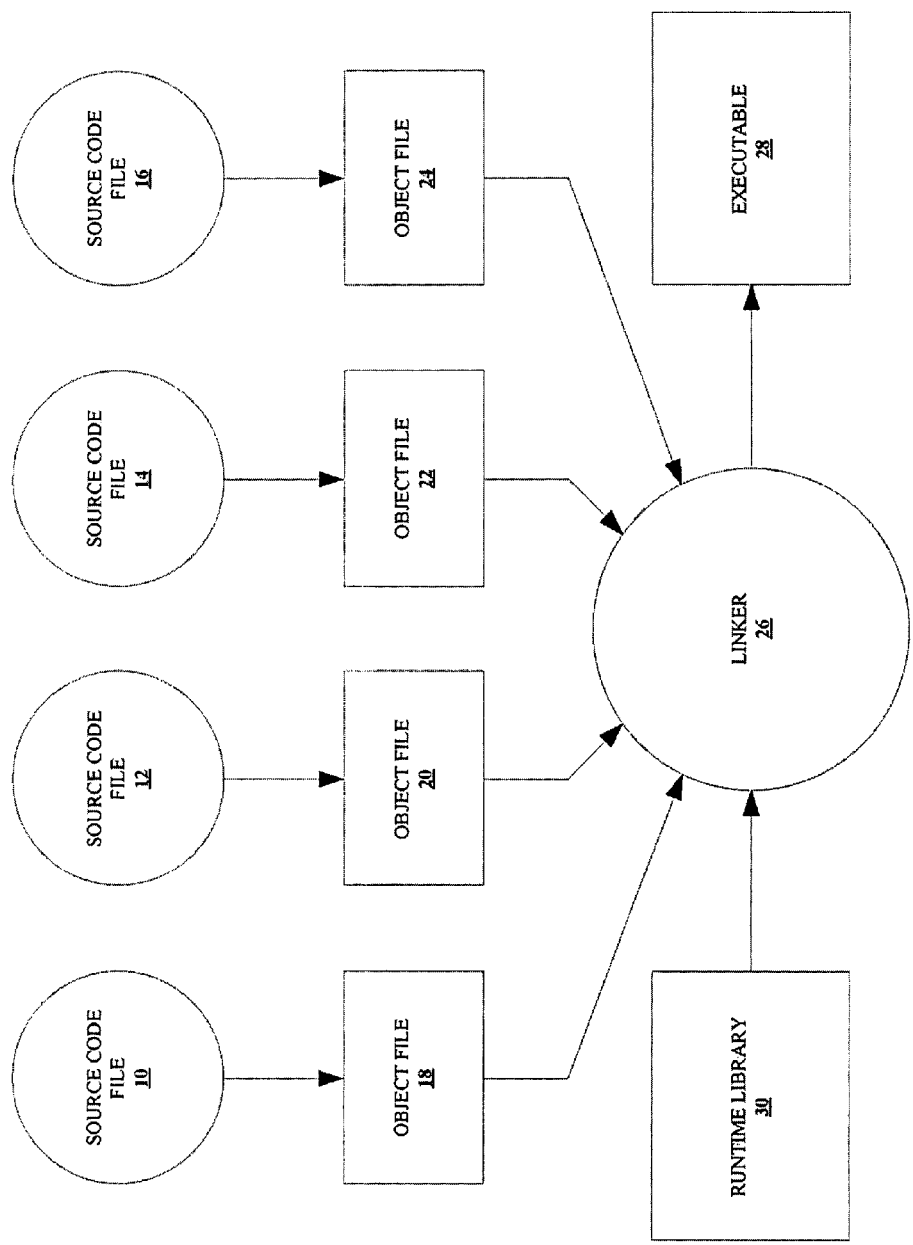
FIG. 1 illustrates a prior art flow diagram for a method of compiling a code base dependent upon one or more external program code modules included in external source files.

The C programming language is one of the most popular and pervasive programming languages in use today. Therefore, many of the examples provided herein are described and illustrated in the context of the C programming language. However, those skilled in the art will appreciate that the general principles of the invention are applicable to a wide variety of compiled and interpreted programming languages.

Consistent with an embodiment of the invention, a code analyzing tool receives from a user an indication of a particular code base to be analyzed for the purpose of identifying any external program code modules upon which the code base is dependent. For example, utilizing a command line interface (CLI), or a graphical user interface (GUI), a user selects or otherwise indicates a particular code base to be analyzed. The code base may be indicated, for example, by a user specifying a filename or a file path for the code base. The code analyzing tool then analyzes the code base and outputs a list of dependent entities (e.g., variables, functions, macros, types, labels) as well as the files containing the program code modules that are associated with the dependent entities required by the code base in order to compile, execute and/or function properly. For example, in the context of the C programming language, an embodiment of the invention identifies external program code dependencies that arise due to preprocessor "#include" directives and identifiers that are referenced in the code base, but not defined within the code base.

In order to avoid the problems described above in connection with prior art methods of identifying program code dependencies, a code analyzing tool consistent with an embodiment of the invention processes the code base in a manner similar to how a compiler or interpreter would process the code base. For example, a code analyzing tool for analyzing a code base written in the C programming language performs similar steps as the C compiler would use to compile the code base. Accordingly, the code analyzing tool has access to all of the same compilation parameters that would be used by the compiler when compiling the code base, including compilation parameters specific to the particular compiler used for compiling the code base, as well as any compilation parameters that are set out in a makefile used to compile the code base. Consequently, those external programming code dependencies that are dependent upon a compilation parameter—and therefore can only be determined at compile time—can be correctly identified by the tool. Furthermore, in determining code dependencies, the code analyzing tool takes into consideration the scope and namespace of any identifiers set out in the code base. Therefore, a method consistent with the invention will properly identify the definition of an identifier when two identifiers with the same name, but different scope or namespace, are referenced in the code base.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 3:
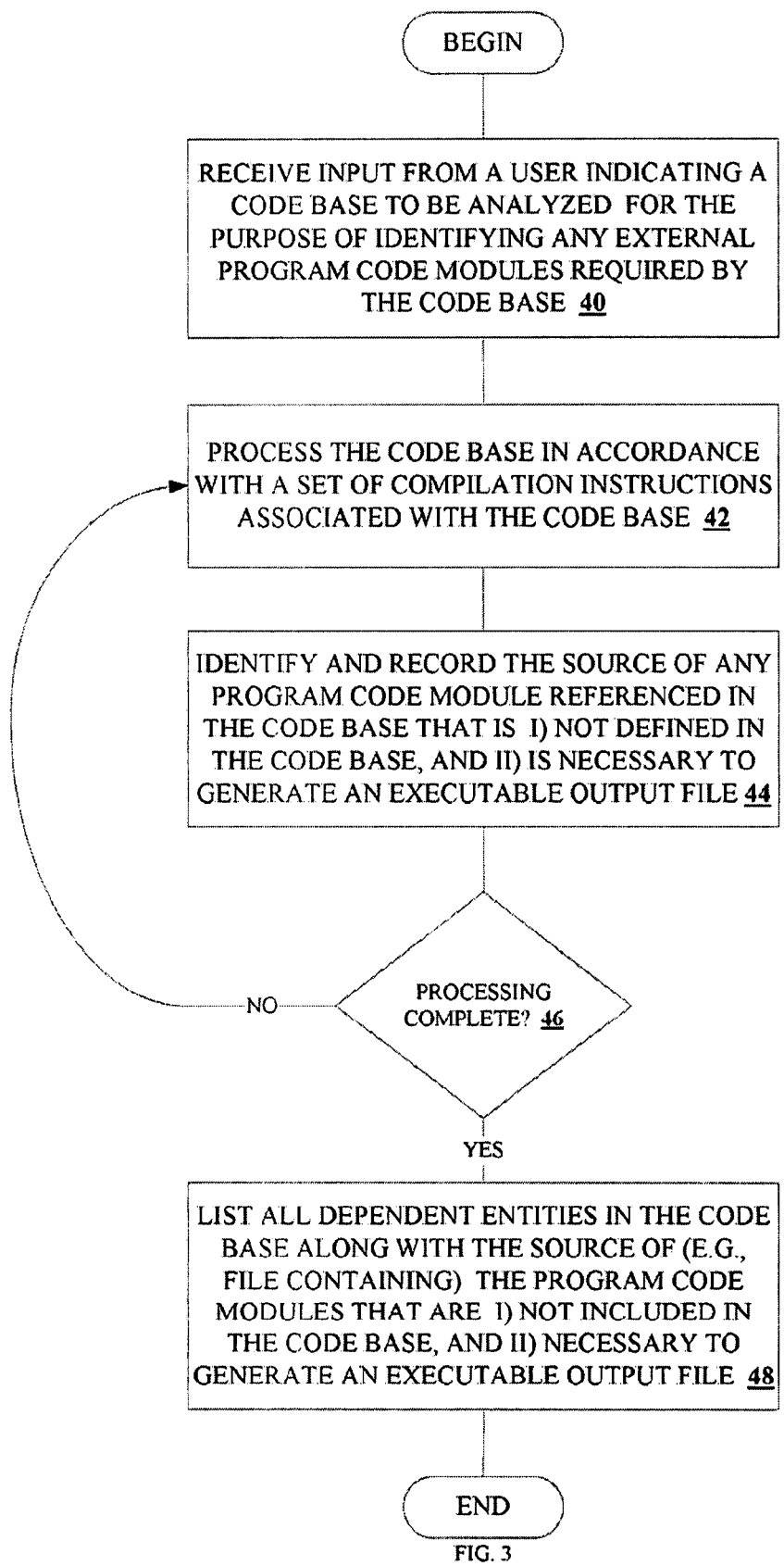
FIG. 3 illustrates a method, according to an embodiment of the invention, for enumerating external program code dependencies for a code base.

FIG. 3 illustrates a method, according to an embodiment of the invention, for enumerating program code dependencies. At method operation 40, user-input indicating a particular code base to be analyzed is received. For example, a user may type the filename or file path of a particular code base to be analyzed. Alternatively, in one embodiment of the invention, the code analyzer tool may have a graphical user interface. Accordingly, a user may indicate the code base to be analyzed by selecting it with a cursor control or pointing device (e.g., a mouse).

Next, at method operation 42, the code base is processed in accordance with a set of compilation instructions associated with the code base. In general, the processing involves parsing the code base, performing syntactic analysis, and semantic analysis. For example, if the code base is written in the C programming language, the compilation instructions associated with the code base will be instructions based on, or which mirror, those of a C compiler. For example, in one embodiment of the invention, the code analyzer will mirror or mimic the operations performed by a compiler when compiling the code base. In another embodiment of the invention, the code analyzer tool may be implemented in part based on open source code of the compiler, when available. In any case, for the C programming language, as part of the processing (method operation 42), a pre-processing operation is performed, and any "#include" preprocessor directives are processed in accordance with compilation parameters specific to the compiler used for compiling the code base, and/or any compilation parameters specified in a makefile associated with the code base.

At method operation 44, the program code modules referenced, but not defined, in the code base, are identified and recorded. That is, the external program code modules necessary for compiling an application are identified. For example, if during the preprocessing operation, one or more "#include" preprocessor directives are processed, the code analyzer tool records the source of any program code module that is included, so that the code analyzer tool can later list the source of the program code module as an external dependency.

if necessary, at method operation 46, the code base continues to be processed. For example, in the case of the C programming language, after the preprocessing operation is completed, a lexical analysis operation is performed and the programming code is converted to tokens. At any time during the processing of the code, if an external program code dependency is identified, it is recorded so that it can be listed. The semantic analysis may also include building a symbol table.

Again, if during the building of the symbol table a dependent external program code module is identified, the dependency is recorded so that it can be enumerated after processing the code has completed. This process continues until the code base has been processed completely.

Finally, at method operation 48, a list of dependent entities (e.g., variables, functions, macros, types, labels) and corresponding files are enumerated. For example, for each dependent entity identified in the code base, the dependent entity is listed along with the corresponding file name and file path to the particular file containing the program code module for the entity.

In one embodiment of the invention, the method for enumerating external program code dependencies (as described in connection with FIG. 3) may be part of a process for automatically porting an application, designed to operate on one system, to a different system. For instances, the method may be part of a process for automatically porting an application from one operating system (OS) to another OS. Such a method is described in connected with FIG. 4 below.

Figure 4:
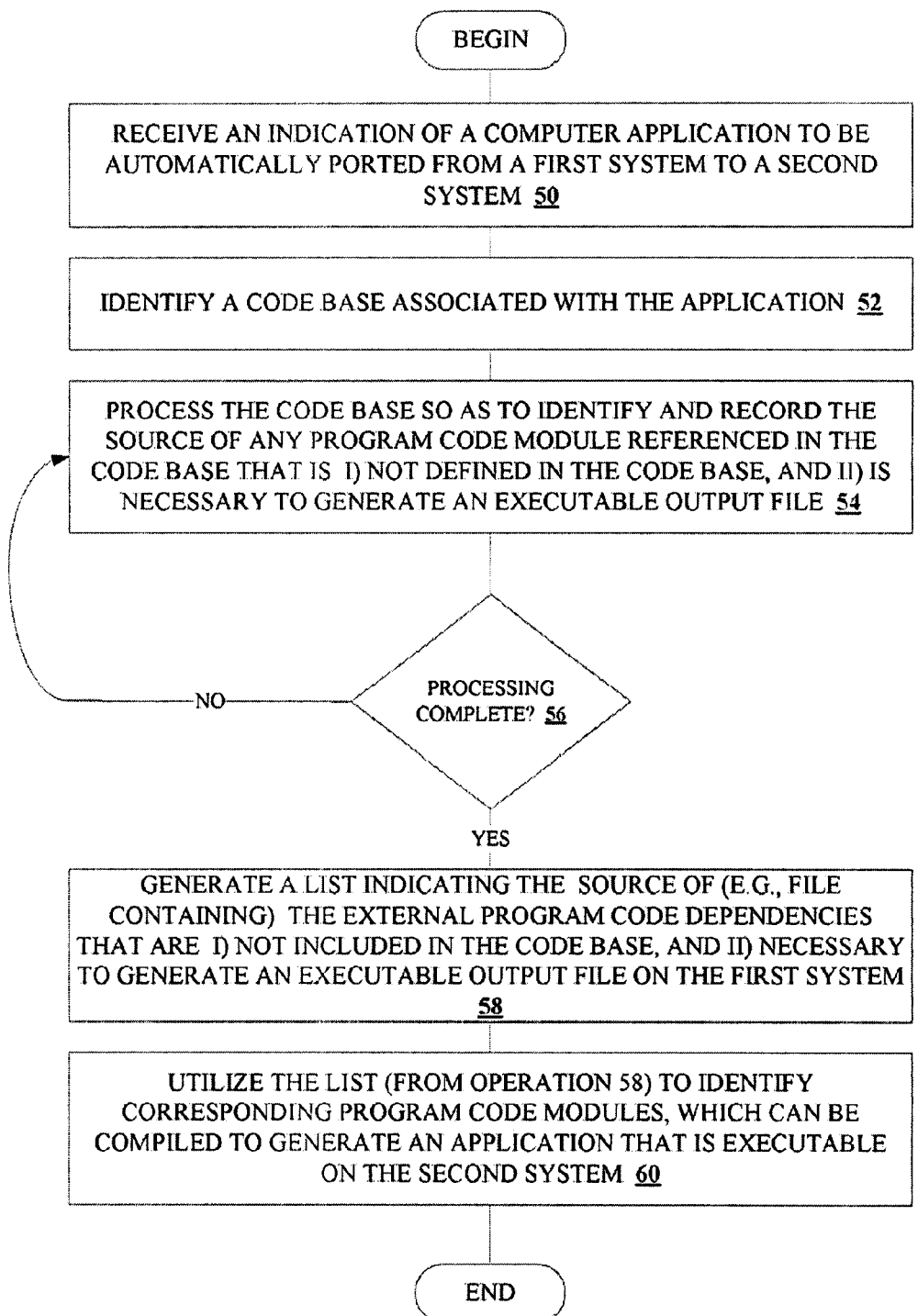
FIG. 4 illustrates a method, according to an embodiment of the invention, for automatically porting a software code base from one computing platform to another.

Referring to FIG. 4, the method begins at operation 50 with a computer process receiving an indication of a computer application to be automatically ported from a first system to a second system. For instance, a user may select an application via a graphical user interface forming the front end of a software application designed to automate the porting of applications. Accordingly, a user may simply select or click (e.g., with a pointing device, such as a mouse) the desired application to be ported. Alternatively, a user may type the name of an application (e.g., the name of an executable file) at a command line.

Once an application has been indicated, at method operation 52 the automated porting process matches the application with a code base. For example, in one embodiment of the invention, the porting application may keep a table (or some other data construct) that maps each executable application with a code base—for instance, a file or set of files containing the base source code for the executable application. Accordingly, the automated porting process identifies the base source code used to generate the executable file for the first system.

Next, at operation 54, the automated porting process identifies any external program code dependencies. That is, the porting application processes the base source code so as to identify the source of any external program code dependencies which are referenced, but not defined, in the base source code, and are necessary for generating the executable. The process of identifying the external program code dependencies is essentially the same as described in connection with FIG. 3. Accordingly, as indicated by method operation 56 in FIG. 4, the processing continues until all external program code dependencies are identified.

Next, at method operation 58, a list of all external program code dependencies is generated. In one embodiment of the invention, this list is utilized by the porting process to map the identified external program code dependencies of the executable application for the first system to corresponding program code in a second system, for example, the target system. To that end, in one embodiment of the invention, the automated porting application maintains a set of mappings for functions, data structures, and other possible dependencies for different systems and/or architectures. The mapping may be implemented by use of a mapping library that maps a set of identifiers on the first system to the corresponding functionality on the second system. For example when porting an application from execution environment A to execution environment B, a mapping library would provide the functionality in execution environment A required by the application being ported using the operations in execution environment B. For example, a particular function in execution environment A required by the application being ported would be provided by the mapping library for execution environment B. The required functionality in execution environment A may be implemented using one or more features of the target system. The mapping libraries may be manually maintained or automatically maintained. For example, in one embodiment of the invention, as new program code modules are added to a software code repository, the automated porting application (or a related software development, or code repository application) may prompt a software developer to identify any associated functionality on other systems to which the new program code module's external functions correspond. In this way, the program code mapping is kept up-to-date via a semi-automated means.

In one embodiment of the invention, if no corresponding functionality for the target system can be identified by the mapping operation for a particular external program code dependency, the automated porting application will keep a record of such unresolved dependencies, and generate a list of such unresolved dependencies. Accordingly, a software developer can either manually map or select a corresponding code module, or if none exists, the software developer can create a new code module for the target system. Alternatively, the software developer may determine how to modify the original code modules (e.g., the code modules identified in method operation 56) to eliminate any external program code dependencies for which no corresponding functionality exists for the target system.

Finally, at method operation 60, the code listing generated at method operation 58 is utilized to automatically generate an application for the target system. For example, in a best case scenario—where each external program code dependency has a corresponding code module for the target system—the porting process may perform a compilation process to compile the application and generate an executable for the target system. Accordingly, in a best case scenario, the process for porting an application from one system to another may be entirely automated. In those cases where one or more external program code dependencies in the original application do not map to a corresponding code module for the target system, the software developer is provided with a list identifying not only the needed functionality for the target, but those original code modules which provided the functionality on the original system. Consequently, the software developer is informed early on in the porting process of the amount of work, and/or the level of complexity, that may be involved in porting an application from one system to another. This greatly simplifies the porting process for the software developer.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Specifically, those skilled in the art will appreciate the invention's applicability to programming languages beyond the C programming language. Furthermore, in one embodiment, the invention may be embodied as a set of instructions on a computer-readable medium, such that, when the instructions are executed by a computer, the method described in connection with FIG. 3 is performed by the computer. In general, the scope of the invention is defined by the claims and their equivalents.

What is claimed is:

1. A method for identifying an external program code dependency, comprising:
   executing compiler functionality upon a code base to generate compilation parameters indicative of external programming code dependencies between one or more entities within the code base and one or more external program code modules, the compilation parameters not predefined before execution of the compiler functionality; and
   determining an external program code dependency indicative of a dependency between an entity within the code base and an external program code module based upon the compilation parameters, the external program code dependency comprising an indication of a source associated with the external program code module, at least one of the execution of the compiler functionality and the determination of the external program code dependency being automated, at least some of at least one of the executing and the determining implemented at least in part via a processor.

2. The method of claim 1, the determining comprising:
   analyzing one or more compilation parameters within a makefile to identify the source associated with the external program code module.

3. The method of claim 1, the source associated with the external program code module not comprised within the code base.

4. The method of claim 1, comprising:
   determining the external program code dependency based upon a namespace of the entity.

5. The method of claim 1, comprising:
   performing preprocessing analysis of the code base to identify preprocessor directives identifying one or more external program code modules; and
   determining the external program code dependency based upon the preprocessor directives.

6. The method of claim 1, comprising:
   performing a lexical analysis to convert the code base into a set of tokens; and
   determining the external program code dependency based upon the set of tokens.

7. The method of claim 1, comprising:
   performing semantic analysis upon the code base to generate a symbol table listing one or more identifiers utilized in the code base and one or more external program code modules; and
   determining the external program code dependency based upon the symbol table.

8. The method of claim 1, comprising:
   utilizing the external program code dependency to automatically port a computer application associated with the code base from a first computing system to a second computing system.

9. The method of claim 1, the external program code module necessary to generate an executable output file from the code base.

10. A system comprising:
    one or more processors; and
    a memory comprising processor executable instructions that when executed by one or more of the processors perform a method comprising:
       executing compiler functionality upon a code base to generate compilation parameters indicative of external programming code dependencies between one or more entities within the code base and one or more external program code modules; and
       determining an external program code dependency indicative of a dependency between an entity within the code base and an external program code module based upon the compilation parameters, the external program code dependency comprising an indication of a source associated with the external program code module, at least one of the execution of the compiler functionality and the determination of the external program code dependency being automated.

11. A computer-readable storage medium comprising instructions for performing a method for identifying an external program code dependency, the method comprising:
    executing compiler functionality upon a code base to generate compilation parameters indicative of external programming code dependencies between one or more entities within the code base and one or more external program code modules, the compilation parameters not predefined before execution of the compiler functionality;
    determining an external program code dependency indicative of a dependency between an entity within the code base and an external program code module based upon the compilation parameters, the external program code dependency comprising an indication of a source associated with the external program code module; and
    utilizing the external program code dependency to automatically port a computer application associated with the code base from a first computing system to a second computing system, at least one of the execution of the compiler functionality and the determination of the external program code dependency being automated.

12. The computer-readable storage medium of claim 11, comprising:
    mapping the external program code dependency to a second external program code module associated with the second computing system.

13. The computer-readable storage medium of claim 12, comprising:
    providing the second external program code module to an automated compiler.

14. The computer-readable storage medium of claim 13, comprising:
    invoking the automated compiler to compile the second external program code module into a second computer application executable by the second computing system.

15. The computer-readable storage medium of claim 11, comprising:
    determining the external program code dependency does not map to a second external program code module associated with the second computing system.

16. The computer-readable storage medium of claim 15, comprising:
    providing a notification that the external program code dependency does not map to the second external program code module.

17. The computer-readable storage medium of claim 11, the determining comprising:
    analyzing one or more compilation parameters within a makefile to identify the source associated with the external program code module.

18. The computer-readable storage medium of claim 11, comprising:
    determining the external program code dependency based upon a namespace of the entity.

19. The computer-readable storage medium of claim 11, comprising:

performing preprocessing analysis of the code base to identify preprocessor directives identifying one or more external program code modules; and determining the external program code dependency based upon the preprocessor directives.

20. The computer-readable storage medium of claim 11, comprising:

performing semantic analysis upon the code base to generate a symbol table listing one or more identifiers utilized in the code base and one or more external program code modules; and determining the external program code dependency based upon the symbol table.

\* \* \* \* \*